United States Patent Office 3,753,952
Patented Aug. 21, 1973

3,753,952
PHOTODEGRADABLE COMPOSITION
James Edwin Guillet, Don Mills, Ontario, Canada, assignor to The Governors of the University of Toronto, Toronto, Ontario, Canada
No Drawing. Continuation-in-part of abandoned application Ser. No. 763,980, Sept. 30, 1968. This application Apr. 19, 1971, Ser. No. 135,424
Claims priority, application Great Britain, Apr. 27, 1970, 20,101/70; May 14, 1970, 23,387/70
Int. Cl. C08f 15/12
U.S. Cl. 260—63 R
14 Claims

ABSTRACT OF THE DISCLOSURE

Plastics materials suitable for use in packaging are provided, which photodegrade upon exposure to direct sunlight, but which have indefinite storage life otherwise. The materials are polymers of common vinylidene monomers such as ethylene, styrene and methyl methacrylate, containing 0.1–5 mole percent of keto carbonyl groups located in side chains but adjacent the main chain of the polymer. These keto groups absorb U.V. radiation and cause photodegradation of the polymer.

CROSS-REFERENCE TO RELATED APPLICATIONS

This application is a continuation-in-part of U.S. patent application Ser. No. 763,980, filed Sept. 30, 1968 and now abandoned.

BACKGROUND OF THE INVENTION

Field of the invention

This invention relates to disposable plastic packaging materials, such as films, wrappers, cups, bottles, trays, cartons, and the like which are commonly used for packaging perishable commodities such as food, condiments, beverages etc., and household products in general. The invention also relates to plastic compositions suitable for use in such packaging materials. More specifically, it relates to plastic packaging materials, and plastic compositions for use therein, which when discarded in an outdoor environment will degrade to become part of the soil, or be washed away by rainfall or wind erosion in a harmless form.

It is well known that the increasing use of plastic packaging materials which are then discarded has created serious problems of pollution and litter. Because most conventional plastic materials used in packaging have long lifetimes in exterior environments the accumulation of litter of these materials in parks and recreational areas, and even in conventional garbage dumps, has led to many environmental and esthetic problems. Materials which would degrade to harmless products in such a situation would have great advantages over conventional packaging materials.

Materials which gradually decompose would, of course, solve the litter and pollution problem, provided they decomposed relatively rapidly. Such materials could perhaps be made by including in a packaging plastic an agent which causes the material to decompose. However, against this factor of desirable decomposition must be weighed the requirement that the shelf life of the packaging plastic must be rigidly controlled, and in most cases must be indefinitely long, for proper protection of the perishable contents.

DESCRIPTION OF THE PRIOR ART

It is known that copolymers of ethylene with carbon monoxide can be prepared which degrade more rapidly than polyethylene when exposed to ultraviolet light. Such polymers contain ketonic groups in the backbone of the polymer chain thus:

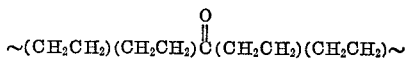

It was shown by Hartley and Guillet (Macromolecules 1, 165 (1968) that the quantum yield for main chain scission for such copolymers at ambient temperatures was about 0.025. This means that for every 100 quanta of light absorbed by the polymer, only 2.5 result in a breaking of the polymer backbone, so the reaction is inefficient. The breaking of the polymer backbone chain is the main reaction involved in the reduction of molecular weight and hence in the degradation of physical properties necessary before the plastic object will be broken up by wind, rain and other forms of natural erosion.

In the case of the ethylene-carbon monoxide copolymers, if the concentration of carbon monoxide is increased in order to provide more rapid degradation, the polymer appears to begin to absorb at longer wavelengths and will degrade in normal room illumination. Thus the shelf life of packaging materials made of these materials is deleteriously affected.

BRIEF SUMMARY OF THE INVENTION

An object of the present invention is to provide novel polymeric compositions of matter.

A further object is to provide polymeric materials suitable for use as packaging materials, which photodegrade after they have been discarded.

A further object is to provide processes for preparing such compositions and materials.

Other object and advantages will become apparent from the following description:

The present invention provides polymeric packaging materials which degrade under the action of the ultraviolet light of the sun, but do not degrade to any appreciable extent otherwise. Thus these polymeric packaging materials start to degrade after they have been discarded in an outdoor environment, but have indefinite storage life indoors, out of contact with direct sunshine.

The wavelengths of light emitted by the sun range from about 2,900 A. in the ultraviolet to about 20,000 A. in the infrared. Only the light with wavelengths ranging from about 4,000 to 8,000 A. is visible to the human eye. Indoor lighting fixtures emit primarily in this visible range. The present invention is based upon the discovery that there can be introduced into a polymer certain photochemically active chemical groups which do not absorb light of wavelength in the visible range, but do absorb ultraviolet radiation in the wavelength range from 3,000 A. to about 3,500. Having absorbed radiation, the groups cause scission of the polymer chains, and hence degradation of the polymer. Thus the degradation process is not initiated until the polymer is exposed to the ultraviolet light of the sun. Furthermore, because ordinary window glass absorbs most of the ultraviolet radiation of the sun, these polymers will not degrade in sunlight which has passed through window glass. Packages or containers made of these materials could be exhibited in store windows, for example, without initiating the degradation process.

Thus according to the present invention, there are provided normally solid polymeric materials capable of being formed into packaging materials, comprising a polymer of a vinylidene unsaturated monomer and containing in the polymer backbone a minor amount of a ketonic structural unit of general formula:

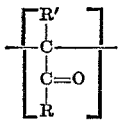

wherein R' represents a hydrogen atom or an alkyl group having from 1–6 carbon atoms and R represents an alkyl group, an alkenyl group or an aryl group, having from 1–9 carbon atoms, said ketonic structural unit being present in an amount which will permit the solid polymeric material to degrade following exposure to natural sunlight.

DESCRIPTION OF THE PREFERRED EMBODIMENTS

Ethylene is a vinylidene unsaturated monomer within the terms of the present specification, and polymers of ethylene containing minor amounts of the ketonic structural unit previously defined comprise one aspect of the present invention. As is well known, polyethylene is one of the more important plastics used for container and packaging purposes. This polymer may be linear or branched depending on the method of synthesis and particularly, on the catalysts used for the polymerization. The conventional polyethylene breaks down slowly by photooxidation in an outdoor environment, but molded and extruded objects still retain their shape and an appreciable portion of their original strength for several years under normal weather conditions.

Other vinylidene unsaturated monomers, besides ethylene which can be used in accordance with the present invention are in general those of the general structure:

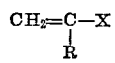

where R is hydrogen, halogen or an alkyl group, and X is a functional group such as phenyl, substituted phenyl, carboxylic acid, ester, halogen, nitrile or alkenyl. Polymers of such monomers are conventionally used commonly for packaging materials and containers, and like conventional polyethylene break down very slowly by photo-oxidation in an outdoor environment. However, molded and extruded objects of them still retain their shape and an appreciable portion of their original strength for several years under normal weather conditions. The present invention provides materials based on these common monomers, including ethylene which have accelerated rates of photodegradation.

The polymeric materials of the present invention are distinguished from copolymers of ethylene and carbon monoxide in having ketone carbonyl groups not in the backbone, or main chain, of the polymer, but at a carbon atom immediately adjacent to the backbone chain of the polymer. It has been found that the efficiency of the chain breaking reaction is increased to between five and ten times that of the ethylene-carbon monoxide copolymers, where the carbonyl is in the main chain.

Thus the materials of the present invention are more rapidly photodegradable on exposure to ultraviolet light, and this is achieved without endangering the stability of the materials in ordinary visible light. Further, this is accomplished without the use of additives which might exude or dissolve in the product, e.g. food, being packaged.

In the specific aspect of the invention where ethylene is used, the structure included in the polymer backbone is of the form:

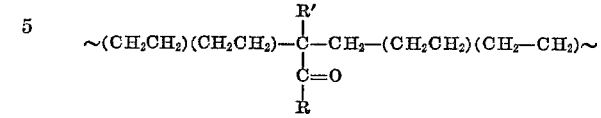

where ($CH_2CH_2$) represents a polymerized ethylene unit and R and R' are as previously defined.

The ketonic structural unit may be introduced into the polymer chain by copolymerization of the selected vinylidene monomer with a polymerizable vinyl or vinylidene monomer of the general structure:

where R and R' are as previously defined. Examples of such monomers are methyl vinyl ketone, ethyl vinyl ketone, propyl vinyl ketone, isopropyl vinyl ketone, butyl vinyl ketone, methyl isopropenyl ketone, ethyl isopropenyl ketone, methyl isobutenyl ketone, phenyl vinyl ketone, and the like.

An alternative method of introducing the ketonic structural unit into polymers is to react the preformed polymer with an acylating agent such as acetyl chloride, which will add to the internal double bonds in the system. This reaction is carried out in the presence of a catalyst such as aluminum trichloride. Preformed polymers can also be treated with biacetyl, in the presence of radiation, whereupon the biacetyl decomposes to form free radicals

which attach to the polymer chain to give the desired ketonic structural units.

The group R in the ketonic structural group of the polymers of the present invention can generally represent an alkyl group having 1–9 carbon atoms, an alkenyl group having 1–9 carbon atoms or an aryl group having 1–9 carbon atoms, and can also represent such groups when substituted by other functional groups. In the case where R is an alkenyl group, it is preferred that the carbon which adjoins the carbon atom of the keto group is not involved in the unsaturation of the group. Where there is carbon-to-carbon unsaturation at a position conjugated with the C=O bond of the side chain keto carbonyl, there appears to be interference with the wavelength of light which is absorbed by the side chain keto carbonyl group. Such materials tend to absorb in the visible light range as well as in the ultraviolet range. As previously described, this is undesirable as effecting the shelf life of the materials made from these polymers.

In order to achieve the maximum effect it is desirable that the ketone groups be distributed throughout the entire polymer chain and preferably at maximum distance from each other. Further, it is important that most of the polymer chains contain some ketonic groups, otherwise some of the polymer will not degrade photochemically. If the keto-containing polymer is prepared by copolymerization with a vinyl or vinylidene monomer it will be desirable to select a monomer having the correct reactivity ratio, and a suitable polymerization system, so that a uniform copolymer is obtained. Alternatively one may use a continuous process whereby the monomer ratio in the reactor is kept constant throughout the reaction.

As will be clear from the foregoing, the process and compositions which can be used in the practice of this invention are not restricted to binary copolymers with a ketone comonomer, but also apply to multi-component copolymers with other monomers. Monomers which may be used to synthesize the copolymers of this invention include ethylene, styrene, methyl acrylate, methyl methacrylate, vinyl acetate, methacrylonitrile, acrylonitrile, vinyl chloride acrylic acid, methacrylic acid, etc. Especially preferred are polymers of styrene, methyl methacrylate and methyl acrylate.

The amount of ketone carbonyl included in the polymer is important in achieving the objects of the present invention. This can be expressed as a mole percentage of ketone carbonyl based on the monomers included in the polymer, in which case the amount should range from about 0.1 mole percent to about 10 mole percent and preferably from about 0.1 mole percent to about 5 mole percent. Alternatively it may be expressed as a weight percentage, in which case the amount of ketone carbonyl should be from about 0.02 weight percent to about 2 weight percent ketone carbonyl, and preferably from about 0.2 to about 1 weight percent. The amount actually used will be determined by the rate and extent of degradation required. In the case of ethylene polymers ketone contents up to 10 mole percent can be used and the advantage of the invention obtained. However, above 5 mole percent, the polyethylene-type properties tend to be lost. Higher concentrations lead to faster degradation rates up to a limit determined by the thickness of the object to be fabricated from the plastic. If too much carbonyl is included only the surface layers will absorb the U.V. light. Whilst these surface layers will degrade, their residues will remain and protect the interior of the material from the U.V. light, in the absence of some mechanical means for their removal. Thus, very little degradation will occur in the bulk of the material. The optimum concentration can be calculated for a given specimen thickness using the Beer-Lambert Law of photochemistry. For this reason, polymers to be extruded as thin films may contain higher keto carbonyl concentrations than those used in the manufacture of thicker sections such as in bottles or waste containers. For example the approximate film thickness at which 90% of the ultraviolet light of 3130 A. wavelength for copolymers of various concentrations of aliphatic ketone groups is indicated in the following table:

| Mole percent ketone carbonyl: | Film thickness for 90% absorption, cm. |
| --- | --- |
| 5.5 | 0.10 |
| 2.8 | 0.20 |
| 1.5 | 0.40 |
| 0.5 | 1.0 |

The rate at which plastic films or molded pieces degrade in the presence of ultraviolet light can be determined in the laboratory using a mercury vapor arc and filter system. The apparatus consists of a 250 watt medium pressure mercury lamp (A.E.I. type ME/D), with a quartz lens which focusses the light from the lamp into a parallel beam. A solution filter is used to eliminate the visible and infrared radiation and an interference filter isolates the mercury line at 3130 A. This light then impinges on the plastic film or molded object which is held in a metal frame in a metal block thermostatted to maintain its temperature at 25° C. The intensity of the light is monitored with a photocell behind the plastic specimen. The response of the photocell is calibrated using a uranyl oxalate actinometer. To determine the amount of light absorbed, the intensity of the lamp is measured before and after each exposure using the photocell. The intensity of the light passing through the plastic can also be measured during exposure. The lamp intensity depends on various factors such as the voltage supplied, the age of the lamp, and the characteristics of the filters used. In a typical experiment, an exposure of 24 hours in the lamp system is equivalent to the amount of U.V. radiation received in the same area of a plastic sample in an average summer month.

The efficiency and rate of the photodegradation is determined by measuring the number average molecular weight of the specimen before and after irradiation. The quantity $$\left[\frac{(\overline{M}_n)°}{\overline{M}_n} - 1\right]$$

is the number of bonds broken per original polymer molecule in the specimen. Usually 5 to 10 breaks are sufficient to render the material brittle and friable so that it will break up under the action of normal erosion processes. The efficiency of the process is the total number of main chain bonds broken per quantum of light absorbed. This is called the quantum yield $\phi$, and ranges from about 0.003 to unity depending on the structure of the polymer and other factors. The larger the value of $\phi$ the more effective is the degradation process.

The photodegradation mechanism by which the polymers of the present invention degrade appears to involve interaction of at least two different chemical groups at different locations along the polymeric chain. For this to occur, the polymer chain must have a considerable degree of mobility and flexibility. It is known that polymers in the liquid state, i.e. in the melt or in solution, have much mobility and flexibility, but it was not to be expected that the polymers of the present invention would have this mobility and flexibility in the solid state, i.e. as films and molded products. To facilitate this degradation, therefore, and to increase the rate of degradation, it is desirable that the flexibility of the polymer chains be maintained, and this means that the polymers should have glass transition temperatures below the temperature of the environment in which they are exposed to ultraviolet radiation. Polymers with higher glass transition temperatures will photodegrade, but more slowly.

The copolymers of this invention can be prepared by any of the conventional means of polymerization which are known to be suitable for the specific monomers chosen. Within the limits of catalyst composition either low or high pressure processes may be employed. The processes may comprise solution, suspension, bulk, emulsion, free radical, gas phase etc. The polymers may be prepared in batch autoclaves, or as is more common in industrial practice, in continuous stirred or in tubular reactors. Small amounts of antioxidants and other additives may be present during polymerization or added later. They may be processed in conventional molding, extruding, blow-molding or other fabrication processes. They may be used as injection molded objects such as containers, or as extruded films or blown bottles. They may also be employed as coatings for wood, metal, paper and other substrates where protection from exterior environment is desired for only a limited time.

The invention is further illustrated by but is not to be considered as limited to the following examples:

EXAMPLE 1

Poly methyl methacrylate (MMA) and copolymers of methyl methacrylate with methyl vinyl ketone were prepared by free radical polymerization in sealed borosilicate glass tubes under vacuum using lauroyl peroxide as the initiator. The polymerizations were run at 60° C. for 24 hours and the conversion was approximately 20%. The polymer formed was dissolved in benzene and reprecipitated several times with methanol to remove catalyst residues and unreacted monomer, then dried to constant weight under vacuum at 50° C. The properties of the polymers prepared are given in Table 1:

showed an appreciable rate of degradation even at room temperature.

TABLE 1.—SUMMARY OF POLYMER DATA

| Sample | Composition | Percent MVK | Toluene conc. | Initiator conc., percent | $\overline{M}_v$ [1] | $\overline{M}_v$ [2] | $\overline{M}_v/\overline{M}_n$ [2] |
|---|---|---|---|---|---|---|---|
| A | MMA-MVK | 2.9 | 0 | 1.0 | 840,000 | 170,000 | |
| B | MMA-MVK | 3.0 | 66 | 2.5 | 67,000 | 33,000 | 2.0 |
| C | Poly MMA | 0 | 66 | 1.0 | 133,000 | 53,000 | 2. |

[1] From intrinsic viscosity in benzene.
[2] Estimated from G.P.C. data in tetrahydrofuran solvent.

Samples B and C were dissolved in benzene solution at a concentration of 5% weight by volume. They were irradiated with U.V. light of wavelength 3130 A. in a quartz cell under vacuum using the apparatus described above for various periods of time, after which samples were removed and the molecular weights measured by viscosity, ebulliometry and gel permeation chromatography (G.P.C.). There was no appreciable change in molecular weight of the poly methyl methacrylate (sample C), but the copolymer (sample B) showed a rapid change in molecular weight. Data obtained are summarized in Table II. Based on these data and quantum yield for chain breaking in the MMA-MVK copolymer was 0.20.

TABLE 2.—SUMMARY OF MOLECULAR WEIGHT DATA ON DEGRADED POLY-MVK-MMA COPOLYMER B

| Light absorbed by polymer (einsteins per gram) | G.P.C. data | | | | Experimental, $M_v$ | Experimental, M (ebulliometer) |
|---|---|---|---|---|---|---|
| | $M_n$ | $M_w$ | $M_v$ | $M_w/M_n$ | | |
| 0 | 31,800 | 66,200 | 61,200 | 2.08 | 66,000 | 32,200 |
| 0.1×10c-4 | 30,400 | 59,800 | 56,000 | 1.97 | 59,800 | |
| 0.2×10c-4 | 28,000 | 55,000 | 52,050 | 1.94 | 55,500 | |
| 1.0×10c-4 | 20,200 | 40,650 | 37,700 | 2.01 | 40,300 | 21,200 |
| 2.0×10c-4 | 14,800 | 31,600 | 28,200 | 2.13 | 30,100 | 15,200 |
| 4.7×10c-4 | 9,450 | 17,990 | 16,400 | 1.91 | 20,500 | 12,600 |

Note.—M determined in chloroform using relation $[\eta]=5.81\times10^{-5} M_v^{0.79}$.

EXAMPLE 2

The polymers of Example 1 were pressed into films of thickness 0.3 mm. in a Carver Laboratory Press at a temperature of 180° C. and a pressure of 20,000 p.s.i. The films were then exposed on a quartz plate in the ultraviolet light system and the rate of degradation measured as in Example 1 by determining the molecular weight before and after degradation. The results are summarized below:

QUANTUM YIELD FOR CHAIN SCISSION

| Polymer | Temperature | |
|---|---|---|
| | 25° C | 86° C |
| Poly MMA (C) | 10c-5 | 10-4 |
| MMA-MVK copolymer (B) | 0.0065 | 0.12 |

There was no appreciable change in the molecular weight of the poly MMA at either temperature, but the copolymer

EXAMPLE 3

Copolymers of styrene and methyl vinyl ketone were prepared by the following procedure: Polymerizations were carried out in 100 ml. flasks equipped with a glass stopper and valve. After monomer, catalyst and 20 ml. ethyl acetate solvent was charged the flask was flushed with nitrogen and heated at 60° C. for 36 hours. The contents were then cooled, poured into 1000 ml. of methanol, filtered and washed with methanol several times and dried in a circulating air oven. The results are summarized in Table 3 below:

TABLE 3

| Sample | Weight | | Benzoyl peroxide, mg. | Yield, percent |
|---|---|---|---|---|
| | Styrene, g. | MVK, g. | | |
| A | 18.0 | 0 | 2.6 | 10.8 |
| B | 18.1 | 0.2 | 10.6 | 14.3 |
| C | 18.0 | 1.0 | 5.6 | 8.3 |

Molded test specimens were pressed from samples A and B in a Carver Press at a temperature of 165° C. and a pressure of 20,000 p.s.i. The thickness of the specimens was 1.2 mm.

Sections cut from these specimens were exposed for a total of 65 hours in the U.V. lamp system described previously. Sample A, pure polystyrene had an initial number average molecular weight of 60,000 and after irradiation it was 58,000. Sample B, containing MVK decreased from 32,000 to 20,000 after irradiation. At this point the polymer became quite brittle and fractured when bent.

Thinner films were then prepared by making 10% solutions of the polymer in benzene, which were then coated on mercury. After removal of the benzene and drying in an air oven, films with thickness of approximately 0.2 mm. were obtained. These were exposed in the ultraviolet lamp system described above and the quantum yield $\phi$ for chain scission determined by measuring the amount of light absorbed and the molecular weight before and after irradiation. These results are shown in Table 4.

TABLE 4.—PHOTOLYSIS OF POLYSTYRENE-METHYL VINYL KETONE COPOLYMERS

| Polymer | Temp. (°C.) | Wt. of film (mg./cm.²) | Time of irradiation (hrs.) | $\overline{M}_n \times 10^{-5}$ | $\phi$ |
|---|---|---|---|---|---|
| Polystyrene (A) | 25 | 27 | 0 | 1.52 | |
| | 25 | 27 | 72 | 1.06 | 1.4×10-5 |
| 1% MVK copolymer (B) | 25 | 16.4 | 0 | 1.03 | |
| | 25 | 16.4 | 23.0 | 0.92 | 10×10-5 |
| | 50 | 16.4 | 21.75 | 0.54 | 100×10-5 |
| | 100 | 16.4 | 24.0 | 0.24 | 680×10-5 |
| | | 16.4 | 24.0 | 0.47 | 120×10-5 |
| 5% MVK copolymer (C) | 25 | 72 | 0 | 0.60 | |
| | 25 | 72 | 72 | 0.32 | 2.0×10-4 |

EXAMPLE 4

Copolymers of styrene and phenyl vinyl ketone were prepared by the same procedure as used in Example 3 except that phenyl vinyl ketone was used in place of methyl vinyl ketone. 1.0 gram of a copolymer of styrene containing 5 wt. percent of phenyl vinyl ketone was dissolved in benzene and irradiated for 1 hour in the ultraviolet light source. The initial number average molecular weight was 75,000 and after irradiation the molecular weight was 21,500. Calculations based on the amount of ultraviolet light absorbed indicated that this amount of degradation corresponds to a quantum yield of chain scission of 0.21. In a similar experiment no change in molecular weight was observed with pure polystyrene.

A 2 mil. film pressed from this copolymer was exposed to the ultraviolet light of the sun for 2 months. Although the original film was tough and flexible, after this exposure it became friable and brittle and had broken into small pieces as a result of the action of wind and rain.

EXAMPLE 5

A copolymer of methyl acrylate and methyl vinyl ketone was prepared by the following procedure: 20 ml. of methyl acrylate monomer was placed in an ampule with 0.33 gm. of benzoyl peroxide and 20 ml. of purified toluene. 0.6 gm. of MVK monomer was added to the mixture and the tube was degassed and sealed under vacuum. The ampule was placed in an oven at 60° overnight. 1 litre of methanol was placed in a 2-litre beaker and cooled with dried ice. The viscous polymer solution was slowly poured into the vigorously stirred and cooled methanol. The precipitated polymer was redissolved and reprecipitated three times to remove impurities. Before the last precipitation the polymer solution was filtered through a pressure filter. The polymer so obtained was freeze-dried from benzene at 0° C.

Weight of polymer was 9.3 gms. (47% yield)
Number average molecular weight: 75,000 (by G.P.C.)

Preparation of film: Films were prepared by pouring a 15–20% solution in ethyl acetate onto water and allowing the ethyl acetate to evaporate. The film was lifted off the water by lifting up the film holder previously placed below it. The film was then dried in the vacuum oven at room temperature for 24 hours. The film was exposed to U.V. radiation between two quartz plates. Rapid photodegradation occurred with a quantum yield of 0.18.

EXAMPLE 6

A 5% copolymer of methyl vinyl ketone and methyl acrylate was prepared by the procedure of Example 5. The yield was 65% and molecular weight 45,000 determined by viscometry in benzene solution. 0.19934 gm. of the polymer was dissolved in 23.5 ml. benzene in a quartz cell. The molecular weight of the polymer was determined after irradiation for various periods of time at 25° C. The results are summarized below:

| Irradiation time | $\overline{M}_v$ | $\phi$ |
|---|---|---|
| 0 | 45,000 | |
| 20 min | 40,000 | .20 |
| 50 min | 35,500 | |
| 90 min | 28,000 | |

A sample of poly methyl acrylate showed no change in molecular weight under these conditions.

The relation between the quantum yield $\phi$ and the rate of degradation for specimens of various thickness is given in Table 5. These data are calculated assuming a ketone absorption spectrum similar to that of diethyl ketone and an average intensity of U.V. light of $1.14 \times 10^{-3}$ Einsteins per square cm. per year. This is estimated to be the amount available in normal sunlight on a plane surface in Washington, D.C. in a normal year. This will obviously change depending on geographic location, but is sufficient to give an idea of the way in which the degradation can be controlled.

TABLE 5.—TIME REQUIRED FOR 10 CHAIN BREAKS PER POLYMER MOLECULE
[Based on U.V. data Washington, D.C. average]

| Thickness quantum yield | 100 mil 2 mm. | 50 mil 1 mm. | 10 mil 0.2 mm. | 5 mil 0.1 mm. | 1 mil 0.02 mm. |
|---|---|---|---|---|---|
| $\phi=0.2$ | 2 months | 1 month | 6 days | 3 days | 1 day. |
| $\phi=0.1$ | 4 months | 2 months | 12 days | 6 days | Do. |
| $\phi=0.02$ | 20 months | 10 months | 2 months | 1 month | 6 days. |
| $\phi=0.01$ | 40 months | 20 months | 4 months | 2 months | 12 days. |
| $\phi=0.001$ | 34 years | 17 years | 3.2 years | 1.6 years | 3 months. |
| $\phi=0.0001$ | | | | | 30 months. |

EXAMPLE 7 (COMPARATIVE)

Polymers and copolymers of ethylene were prepared by the following general procedure:

A solution of 0.008 part by weight of di-tert.butyl peroxide in 20 parts by volume by benzene was charged into a stainless steel autoclave of 100 volumes capacity which had been purged for 3 minutes with a stream of ethylene. The reactor was then closed and pressured to 20,000 p.s.i. with ethylene and the polymerization effected at 140° C. for 2 hours. The reactor was then cooled rapidly to room temperature and vented. The polyethylene thereby obtained very closely resembled the conventional high-pressure polyethylene having a relatively low softening point and a high degree of flexibility. The yield of polymer was 11.3 parts by weight of polyethylene having a density of 0.921 g./cc.

EXAMPLE 8 (COMPARATIVE)

A copolymer of ethylene an dcarbon monoxide was prepared by the procedure of Example 1 except that the ethylene charged to the reactor contained 1.6 mole percent of carbon monoxide. The yield of copolymer was 9.2 parts by weight. The physical properties of the polymer were substantially the same as that of the polyethylene prepared in Example 1, but an infrared spectrum of a molded film showed an absorbance at $5.9\mu$ characteristic of the ketone carbonyl. By calibration with known ketone samples the amount of ketone carbonyl in the copolymer was estimated to be 1.0%.

EXAMPLE 9

The procedure of Example 7 was repeated excepting only that 0.3 part by weight of methyl vinyl ketone (MVK) monomer was charged. The yield of copolymer was 7.1 parts by weight and it contained 0.9 mole percent MVK in the copolymer.

EXAMPLE 10

The procedure of Example 7 was repeated except that 2 parts by weight of MVK monomer was added to the benzene solution before charging the autoclave. The yield of copolymer was 12.1 parts by weight and infrared analysis indicated a composition of 6.7 mole percent MVK in the copolymer.

EXAMPLE 11

The procedure of Example 7 was repeated except that 3 parts by weight of methyl isopropenyl ketone (MIK) was added to the benzene solution. 11.3 parts of copolymer was obtained containing 3.3 parts MIK based on infrared analysis.

EXAMPLE 12

The procedure of Example 7 was repeated except that 1 part by weight of ethyl vinyl ketone (EVK) was charged with the benzene solution of peroxide. The yield of copolymer was 5.7 parts by weight and it contained 2.2 mole percent EVK.

EXAMPLE 13

The procedure of Example 7 was repeated except that 1.2 parts of methyl isopropenyl ketone and 5 parts of vinyl acetate monomer were charged in benzene solution. The yield was 14.3 parts of a copolymer containing 1.6% MIK and 20% vinyl acetate.

EXAMPLE 14

The ethylene interpolymers prepared in the previous examples were molded into films in a Carver press at a temperature of 165° C. and a pressure of 25,000 p.s.i. The resulting films ranged in thickness from 0.3 to 1 mm. Specimens were cut from the films which were then irradiated in air at 25° C. using 3130 A. ultraviolet light using the apparatus described previously. The quantum yield for chain breaking was estimated from the change in solution viscosity measured in Tetralin at 100° C. The irradiation time required to embrittle the film sample was also determined in the same apparatus. The results of these tests are shown in the following Table 6:

TABLE 6

| Polymer | | Ketone composition percent | Quantum yield for chain breaking | Irradiation time to embrittlement |
|---|---|---|---|---|
| 7 | Polyethylene | 0 | 0.001 | 1 week. |
| 8 | Ethylene-CO | 1 | 0.025 | 6 days |
| 9 | Ethylene-MVK | 0.9 | 0.12 | 24 hours. |
| 10 | Ethylene-MVK | 6.7 | 0.16 | 12 hours. |
| 11 | Ethylene-MIK | 3.3 | 0.11 | 18 hours. |
| 12 | Ethylene-EVK | 2.2 | 0.18 | 20 hours. |
| 13 | Ethylene-MIK-VA | 1.6 | 1.13 | 30 hours. |

Samples of the above films were exposed to ordinary room illumination for six months without any evidence of embrittlement.

EXAMPLES 15

The small samples of the films prepared in Example 14 were exposed on the roof of a building in the city of Toronto for various periods of time. Samples 9 to 13 became brittle in periods from 2 weeks to 2 months of exterior exposure to summer sunlight. Sample 8 required 3 months and sample 7 required 6 months to show signs of embrittlement.

What I claim as my invention is:

1. A fabricated photodegradable article comprising a solid photodegradable polymer prepared by copolymerization of a vinylidene monomer of general formula

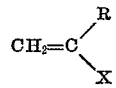

where R is hydrogen, halogen or a lower alkyl group, and X is hydrogen, halogen, nitrile, phenyl, carboxylic acid, carboxylic acid methyl ester, acetate or alkenyl and an unsaturated ketone of the general formula

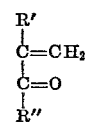

where R' represents hydrogen or an alkyl group having from 1 to 6 carbon atoms, and R" represents an alkyl group, an alkenyl group, an alkaryl group or an aryl group, having 1 to 9 carbon atoms, the amount of ketone carbonyl in the polymer derived from said unsaturated ketone being from about 0.02 to about 2 weight percent based on the total polymer.

2. The article of claim 1 wherein the vinylidene monomer is styrene.

3. The article of claim 1 wherein the vinylidene monomer is methyl methacrylate.

4. The article of claim 1 wherein the vinylidene monomer is methyl acrylate.

5. The article of claim 1 wherein the vinylidene monomer is ethylene.

6. The article of claim 1 wherein the vinylidene monomer is selected from the group consisting of vinyl acetate, methacrylonitrile, acrylonitrile, vinyl chloride, acrylic acid and methacrylic acid.

7. The article of claim 1 wherein the unsaturated ketone is selected from the group consisting of methyl vinyl ketone, ethyl vinyl ketone, propyl vinyl ketone, isopropyl vinyl ketone, butyl vinyl ketone, methyl isopropenyl ketone, ethyl isopropenyl ketone, methyl isobutenyl ketone and phenyl vinyl ketone.

8. The article of claim 1 in the form of a film or container.

9. The article of claim 1 wherein the photodegradable polymer is a copolymer of styrene and methyl vinyl ketone or phenyl vinyl ketone.

10. The article of claim 1 wherein the photodegradable polymer is a copolymer of methyl acrylate and methyl vinyl ketone.

11. The article of claim 1 wherein the photodegradable polymer is a copolymer of methyl methacrylate and methyl vinyl ketone.

12. The article of claim 1 wherein the photodegradable polymer is a copolymer of vinyl acetate and methyl isopropenyl ketone.

13. Copolymers of ethylene and an unsaturated ketone selected from the carbon consisting of methyl vinyl ketone, ethyl vinyl ketone, propyl vinyl ketone, isopropyl vinyl ketone, butyl vinyl ketone, methyl isopropenyl ketone, ethyl isopropenyl ketone and phenyl vinyl ketone, and containing from 0.02 to 2 weight percent of ketone groups.

14. Copolymers according to claim 13 wherein the unsaturated ketone is methyl vinyl ketone or methyl isopropenyl ketone.

References Cited

UNITED STATES PATENTS

| 2,469,788 | 5/1949 | Rust | 260—66 |
| 2,970,978 | 2/1961 | Powers | 260—33.6 |
| 3,272,786 | 9/1966 | Perry | 260—88.7 |
| 3,451,985 | 6/1969 | Mahlo | 260—92.8 |

HAROLD D. ANDERSON, Primary Examiner

L. L. LEE, Assistant Examiner

U.S. Cl. X.R.

117—132 B, 161 UZ, 161 OC; 204—159.14; 260—33.8 UA, 63 N, 63 HA, 86.1 R, 87.5 R, 88.5 S, 93.5 R, 94.9 GD, 96 D; 264—331